US007644095B2

(12) United States Patent  (10) Patent No.: US 7,644,095 B2
Gauthier et al.  (45) Date of Patent: Jan. 5, 2010

(54) METHOD AND SYSTEM FOR COMPOUND DOCUMENT ASSEMBLY WITH DOMAIN-SPECIFIC RULES PROCESSING AND GENERIC SCHEMA MAPPING

(75) Inventors: Charles S. Gauthier, Rochester, MN (US); Terry D. Hardin, Raleigh, NC (US); David G. Herbeck, Rochester, MN (US); John E. Petri, Lewiston, MN (US); Wesley Powers, Bensalem, PA (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/427,862

(22) Filed: Jun. 30, 2006

(65) Prior Publication Data

US 2008/0005138 A1  Jan. 3, 2008

(51) Int. Cl.
*G06F 7/00* (2006.01)
(52) U.S. Cl. ........................ 707/101; 707/100; 707/102
(58) Field of Classification Search ................. 707/100, 707/101, 102

See application file for complete search history.

(56) References Cited

U.S. PATENT DOCUMENTS 7,191,394 B1 *  3/2007  Ardeleanu et al. .......... 715/241
7,318,063 B2 *  1/2008  Brychell et al. ............. 707/100
7,370,270 B2 *  5/2008  Feng ......................... 715/234

OTHER PUBLICATIONS

Article entitled "Content Manager Implementation and Migration Cookbook" by Zhu et al., dated Apr. 2006.*

* cited by examiner

*Primary Examiner*—Tim T. Vo
*Assistant Examiner*—Mahesh H Dwivedi
(74) *Attorney, Agent, or Firm*—Patterson & Sheridan, LLP (57) ABSTRACT

Method, system, and article of manufacture for assembling a compound document according to a collection of domain-specific rules. For example, a content management system (CMS) may be configured to process the domain-specific compound document according to domain-specific schema and rules (e.g., an XML schema and DTD), while at the same time, maintaining the compound document in a generic form according to a generic schema for a compound document format used by the CMS.

15 Claims, 6 Drawing Sheets

METHOD AND SYSTEM FOR COMPOUND DOCUMENT ASSEMBLY WITH DOMAIN-SPECIFIC RULES PROCESSING AND GENERIC SCHEMA MAPPING

BACKGROUND OF THE INVENTION

1. Field of the Invention

Embodiments of the invention are generally related to storing information in a content management system. More specifically, embodiments of the invention are related to a method and system for mapping of domain-specific compound documents from a domain-specific schema to a generic schema utilized by a content management system.

2. Description of the Related Art

Content management systems (CMS) allow multiple users to create, collaborate, and share information. Generally, a CMS system allows users to create, modify, archive, search, and remove data objects from an organized repository. The data objects managed by CMS may include documents, spreadsheets, database records, digital images and digital video sequences. A CMS typically includes tools for document publishing, format management, revision control, indexing, search and retrieval.

One useful feature provided by some CMS systems is to allow users to create a "compound document" (sometimes referred to as virtual document). Generally, a compound document may contain child documents or links to child documents (sometimes referred to as elements or nodes). Additionally, for particular application domains, compound document schemas have been developed that specify structure, content, attribute, and semantic requirements of a compound document used for a specific domain. For example, one domain-specific compound document used by the pharmaceutical industry is the XML-based Electronic Common Technical Document (eCTD). The eCTD is a compound document that includes collection of files assembled by a pharmaceutical company for submission to the United Sates Food and Drug Administration (FDA). Many other examples of specialized compound document structures have been developed for particular applications.

At the same time, however, the compound document schema used by currently available CMS systems is typically very simple and limited to processing a compound document based on each node, the child documents associated with each individual node, the position of each node, and the actions that are available on the nodes. However, as stated, domain-specific compound document standards such as those employed by the pharmaceutical industry (among others) often require a more defined structure and stricter rules governing their compound documents.

In order to provide more intelligent compound document management there are a number of problems that must be overcome. First, with the emergence and standardization of domain-specific compound document grammars (e.g. the compound document specification for the eCTD), it is no longer sufficient to use CMS compound documents in the traditional sense which rely on a simple parent/child containment model. This becomes apparent as an XML-backed compound document conforming to a specific schema needs to maintain its defined structure in order to be a valid and meaningful document. The current state of the art for CMS compound document assembly provides no support for this specialized structure and provides no way to represent or transform XML schemas generically.

Further, current CMS systems do not provide a mechanism for evaluating and enforcing domain-specific rules against the nodes of a compound document. Domain-specific rules are extra rules that cannot be enforced with DTD or schema but are required for validation by a particular domain. For example, a user may not want to allow documents in "draft" state to be inserted into a compound document having a "final" state.

Accordingly there remains a need for techniques for compound document assembly with domain-specific rules processing and for techniques for mapping from a domain-specific schema to a generic schema utilized by a content management system.

SUMMARY OF THE INVENTION

Embodiments of the invention provide an effective solution for compound document assembly that supports native schema/DTD-based validation, domain-specific rules processing, and mapping of domain-specific compound documents from a particular schema to a generic schema utilized by a content management system (CMS).

One embodiment of the invention includes a method of managing a compound document in a content management system (CMS). The method generally includes retrieving a domain-specific compound document configured according to a domain-specific schema and embedding a processing instruction in a node of the domain-specific compound document to reflect a rule associated with the node. The method generally further includes transforming the domain-specific compound document into a generic compound document conforming to a generic compound document schema utilized by the CMS.

Another embodiment of the invention includes computer-readable medium containing a program which, when executed, performs an operation for managing a compound document in a CMS. The operation generally includes retrieving a domain-specific compound document configured according to a domain-specific schema and embedding a processing instruction in a node of the domain-specific compound document to reflect a rule associated with the node. The method generally further includes transforming the domain-specific compound document into a generic compound document conforming to a generic compound document schema utilized by the CMS.

Still another embodiment of the invention includes a system having a processor and a memory containing a CMS. The system may generally be configured to retrieve a domain-specific compound document configured according to a domain-specific schema and embed a processing instruction in a node of the domain-specific compound document to reflect a rule associated with the node. The system may generally be further configured to transform the domain-specific compound document into a generic compound document conforming to a generic compound document schema utilized by the CMS.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the invention provide a method, system, and article of manufacture for assembling a compound document according to a collection of domain-specific rules. For example, a content management system (CMS) may be configured to process the domain-specific compound document according to domain-specific schema and rules (e.g., an XML schema and DTD), while at the same time, maintaining the compound document in a generic form according to a generic schema for a compound document format used by the CMS.

As described in greater detail herein, a CMS may be configured to provide a software application framework for compound document assembly that supports native schema/DTD-based validation, domain-specific rules processing, and mapping XML documents from a particular (i.e., a domain-specific) schema to a generic schema. Once assembled by the CMS, the compound document (configured according to the generic schema) may be rendered and displayed by a client application. In addition, any domain-specific schema requirements, (e.g., XML or DTD schema requirements) or any domain-specific rules (e.g., semantic rules) may embed processing instructions within the compound document.

Generally, a "processing instruction" includes statements embedded within the compound document that do not disrupt how a compound document is processed by the CMS. For example, using XML, statements between "<? ?>" brackets are ignored by a XML validator. By embedding information within "<? ?>" the additional rules and requirements of the domain-specific schema may be represented in the generic compound document. Further, in addition to XML based processing statements or identification elements, attributes or other requirements of a domain-specific document, information embedded in a "<? ?>" node may include a reference to an executable object used to validate the domain specific component document (e.g., a reference to a Java® object).

The processing instructions store the requirements of the domain-specific rules and schema that cannot be represented as part of the generic compound document schema utilized by CMS. By embedding these rules as processing instructions within a generic compound document, the CMS may allow users to create compound documents according to a domain-specific schema (e.g., the eCTD specification), but still provide the flexibility of managing the compound document using the generic schema provided by the CMS application.

Typically, the generic schema organizes a compound document as a hierarchical collection of nodes, where the schema specifies the content, nodes, and position of each portion of the compound document. Each node of the generic compound document may include a child document, a link to a child document, or may provide a placeholder for multiple child documents.

Additionally, embodiments of the invention are described herein relative to the widely used XML markup language. As is known, XML may be used to describe virtually any type of data. For example, XML grammars have been used to describe word processing documents, spreadsheets, database records, digital images and digital video, to name but a few. Further, specialized grammars are frequently used to describe domain-specific data objects, such as rules regarding the structure, content, attributes, or semantics of a particular compound document type. However, the invention is not limited to the XML markup language; rather, embodiments of the invention may be adapted to other markup languages or other data object formats or data representations, whether now known or later developed.

The following description references embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD/DVD-ROM disks readable by a CD/DVD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks and stored on tangible storage media. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
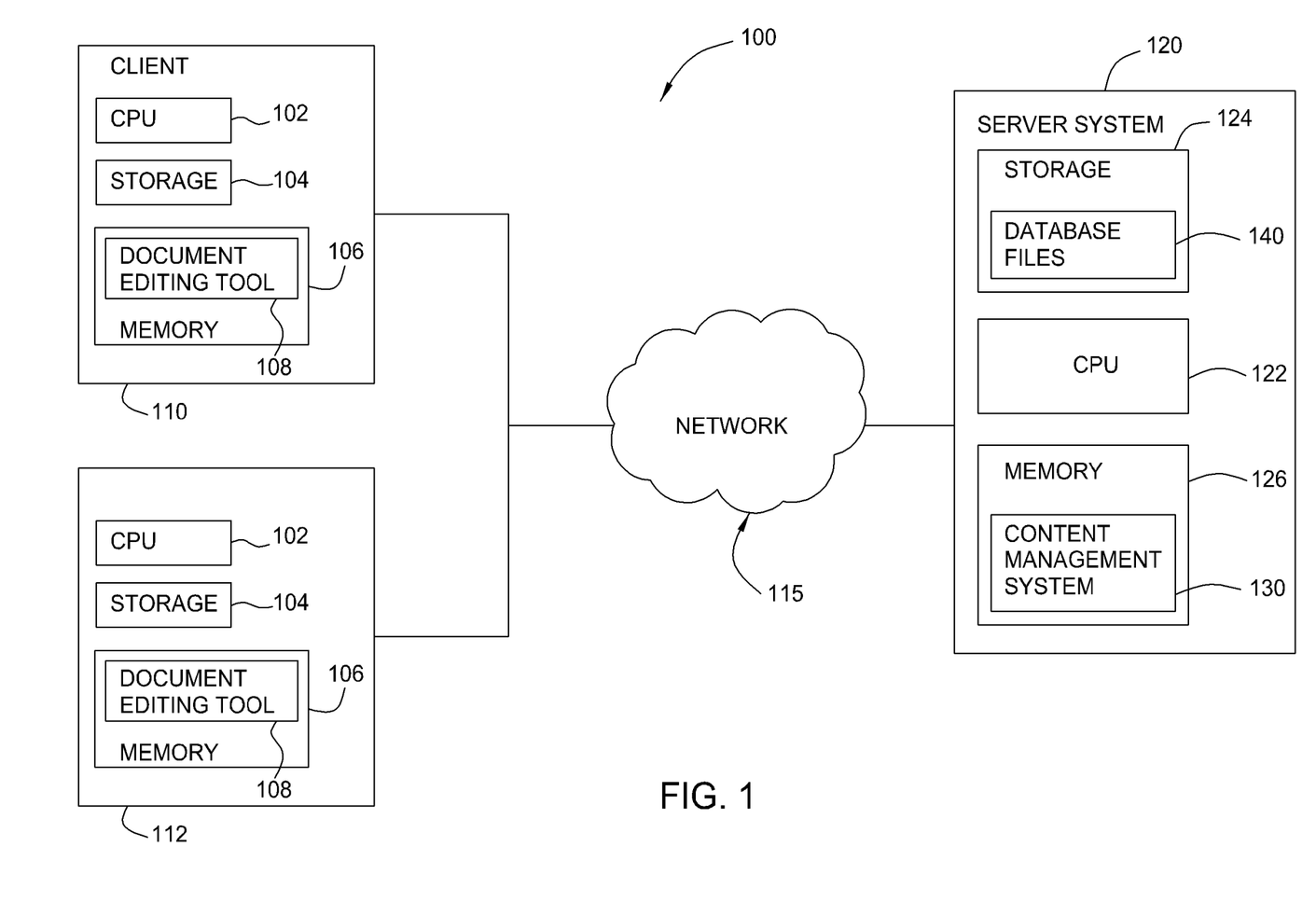
FIG. 1 is a block diagram illustrating a computing environment and content management system, according to one embodiment of the invention.

FIG. 1 is a block diagram illustrating a computing environment 100 and content management system 130, according to one embodiment of the invention. As shown, computing environment 100 includes two client computer systems 110 and 112, network 115 and server system 120. The computer systems 110, 112, and 120 illustrated in environment 100 are included to be representative of existing computer systems, e.g., desktop computers, server computers laptop computers, tablet computers and the like. However, embodiments of the invention are not limited to any particular computing system, application or network architecture and may be adapted to take advantage of new computing systems as they become available. Additionally, those skilled in the art will recognize that the computer systems illustrated in FIG. 1 are simplified to highlight aspects of the present invention and that computing systems and networks typically include a variety of additional elements not shown in FIG. 1.

As shown, client computer systems 110 and 112 each include a CPU 102, storage 104, and memory 106, typically connected by a bus (not shown). CPU 102 is a programmable logic device that performs all the instructions, logic and mathematical processing performed in executing user applications (e.g., a query tool 108). Storage 104 stores application programs and data for use by client computer systems 110 and 112. Typical storage devices 104 include hard-disk drives, flash memory devices, optical media and the like. Network 115 generally represents any kind of data communications network. Accordingly, network 115 may represent both local and wide area networks, including the Internet.

Illustratively, memory 106 of client computer systems 110 and 112 includes a client application 108. In one embodiment, the editing tool 108 is software application that allows end users to access information stored in a content management system (e.g., CMS 130). The client application 108 may be configured to allow users to create, edit, and save a data object, e.g., word-processing documents, spreadsheets, database records, digital images or video data objects. In an alternative embodiment, the client application may be a internet browser configured to access CMS 130 using a distributed middleware application such as an application server or portal server. For example, the WebSphere® application server and Solution for Compliance in a Regulated Environment (SCORE) CMS system available from IBM® may be used. Regardless of the function or data type manipulated by client application 108, users may check-in and check-out compound documents from CMS 130 running on server system 120 as well as perform other compound document editing functions.

As shown, server system 120 also includes a CPU 122, storage 124 and memory 126. Illustratively, storage 124 includes a database 140, and memory 126 includes CMS 130. As stated, CMS 130 may provide a system for creating, modifying, arching and removing information resources from an organized repository (e.g., database files 140). Typically, CMS 130 may include tools used for publishing, format management, revision control, indexing, and search and retrieval of data objects stored by storage 124 and database 140. In one embodiment, CMS 130 may be configured to store and process compound documents composed according to both a generic schema used by the CMS 130 to describe, a compound document having child documents or links to child documents and a domain-specific schema specifying structure, substantive content and semantic rules regarding a domain-specific compound document.

Figure 2:
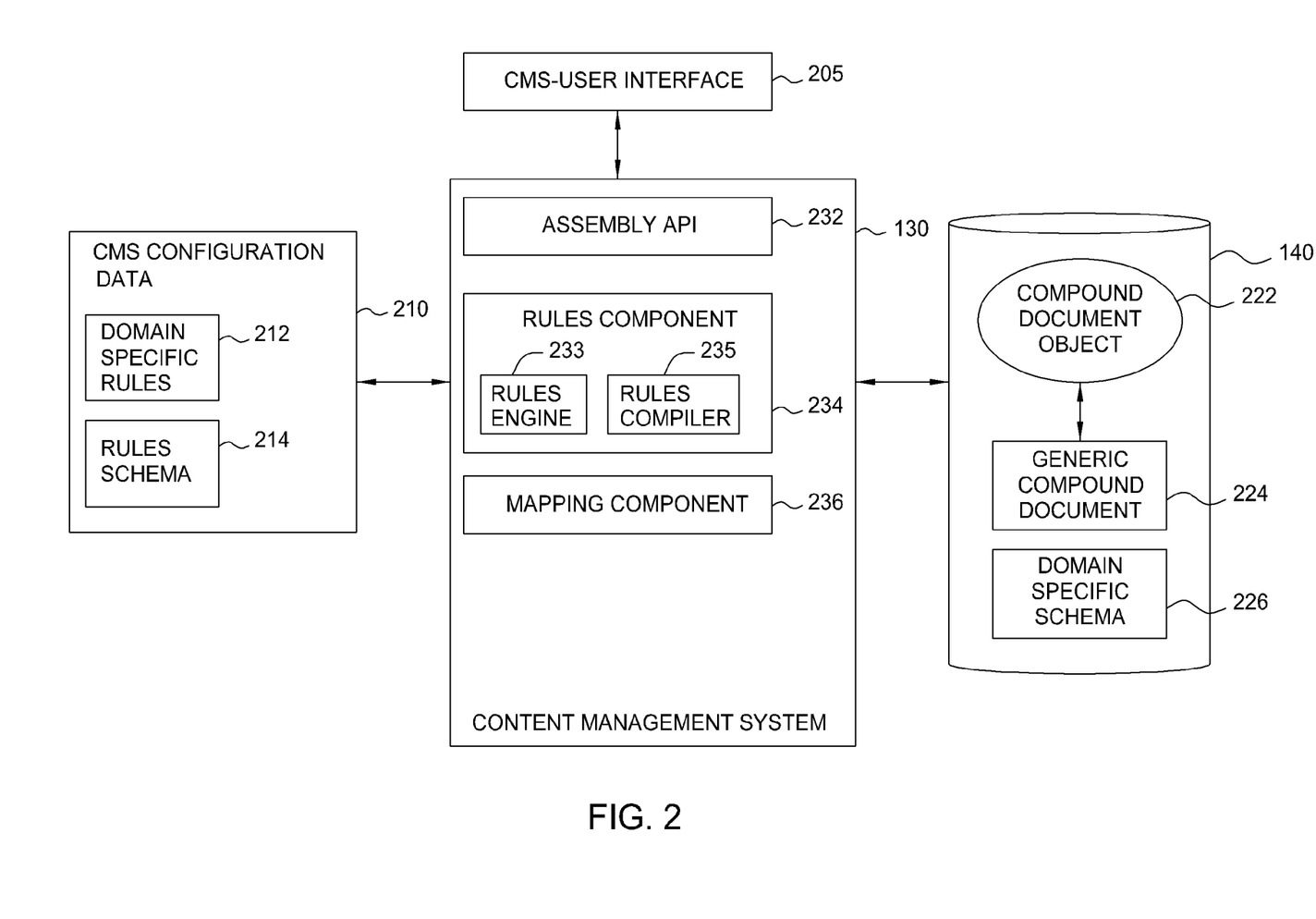
FIG. 2 is a block diagram illustrating components of a content management system, according to one embodiment of the invention.

FIG. 2 is a block diagram further illustrating components of a computing environment 100 and CMS 130, according to one embodiment of the invention. As shown, CMS 130 may interact with a CMS user interface 205, configuration data 210, and data repository 140. Additionally, those skilled in the art will recognize that the CMS 130 illustrated in FIG. 2 is simplified to highlight aspects of the present invention and that CMS systems typically include a variety of additional elements not shown in FIG. 2.

CMS user interface 205 may be configured to provide users with access to compound documents stored by CMS 130. Accordingly, user interface 205 may include mechanisms for checking in/out a compound document from CMS 130, for specifying configuration data 210, and for creating, editing, and rendering a compound document. Illustratively, CMS 130 includes an assembly API 232, a rules component 234 and a mapping component 236. In one embodiment, the assembly API 232 may be configured to assemble and present users with a selected compound document. Further, assembly API 232 may be configured to process user requests users to insert, remove, and rearrange the child documents and links within a compound document. That is, assembly API 232 may allow a user to specify the structure of a compound document; namely the compound document's child documents, which nodes or elements of the compound contain a given child document, and the actions that are available for a given child document. Additionally, when manipulating a given compound document, rules component 235 may be configured to enforce any domain-specific rules 212 or any requirements of domain-specific schema 226 that may apply to a given compound document.

Rules component 234 and mapping component 236 allow CMS 130 to process a compound document arranged using a generic compound document schema. For example, the CMS 1130 may use a generic schema for describing a compound document in terms of the parent and child documents included therein. In one embodiment, the generic schema may include additional elements to allow mapping component 236 to create a representation of a compound document in the format specified using a generic schema to representation specified by domain-specific format specified by domain-specific schema 226 (e.g., using XML, a single placeholder element in the may map to multiple elements/attributes in the domain-specific schema). Conversely, mapping component 236 may also be configured to transform a compound document composed according to domain-specific schema 226 into one composed according to the generic compound document schema used by the CMS 130.

Illustratively, rules component 234 is shown to include a rules engine 233 and a rules compiler 235. In one embodiment, rules compiler 235 may be configured to parse and store a set of rules associated with a particular compound document type. More specifically, rules compiler 235 may be configured to identify which nodes of a domain-specific compound document 224 have a rule 212 applicable to that node. For such nodes, rules compiler 235 may be configured to embed an instruction reflecting the rule within a compound document. When a node of a compound document is subject to a given rule, rules compiler 235 may be configured to embed a processing instruction that includes a rule identifier within the compound document. Thereafter, when a user accesses a compound document, the CMS interface 205 may determine which nodes of the compound document have any associated rules, and which particular rule based on the associated rule identifier. For such nodes, rules engine 233 may be configured to evaluate and enforce the rules for a particular compound document whenever the document is modified or changed by a user interacting with CMS interface 205. In one embodiment, the rules engine 235 may include a schema/DTD-based XML validator and/or a semantic rules validator.

As shown, configuration data 210 includes a rules schema 214 and domain-specific rules 212. Rules schema 214 may provide a description of how valid rules for a particular compound document type may be defined, and domain-specific rules 212 may provide a collection of rules for a compound document of a particular type. In one embodiment, domain-specific rules 212 may be configured for a particular type of compound document. That is, the domain-specific rules 214 may specify aspects of the structure, content, or semantics of the nodes of a compound document. In one embodiment, domain-specific rules 212 may be a collection of XPath queries that correspond to specific elements of the domain-specific schema 226. Additionally, domain-specific rules 212 may be defined as conditions that include an attribute name, conditional operator and values to use for comparison when the rule is used to validate a particular compound document.

Data repository 140 may be used to store the compound documents managed by the CMS 140. Illustratively, data repository 140 includes a compound document object 222, a generic compound document 224, and domain-specific schema 226. As stated, the domain-specific schema 226 may specify elements of the structure, content, and attributes for a compound document of a particular type (e.g., the eCTD compound document). Generic compound document 224 represents a domain-specific compound document transformed by mapping component 236. Compound document object 222 may be an in-memory (e.g., a DOM object) version of generic compound document 224.

Figure 3:
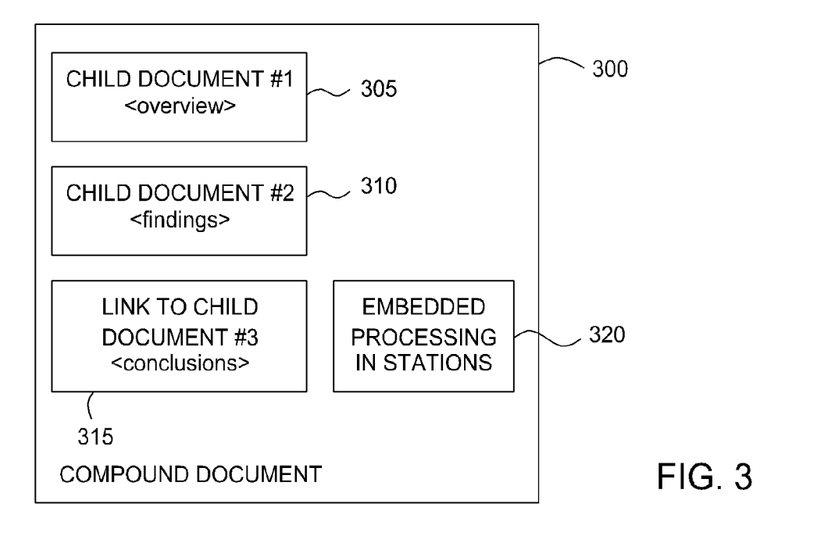
FIG. 3 illustrates an exemplary compound document stored by a content management system, according to one embodiment of the invention.

FIG. 3 illustrates an exemplary compound document 300 managed by a content management system, according to one embodiment of the invention. Compound document 30 is shown represented in a generic format. Accordingly, compound document 300 is arranged as a hierarchy of child nodes; namely, child documents 305, 310, and 315. Illustratively, the child documents 305, 310, and 315 include an <overview> section, a <findings> section, and a <conclusions> section, respectively. In this example, compound document 300 may represent an eCTD document, transformed into a generic format by mapping component 236.

In addition, compound document 300 includes embedded processing instructions 320. In one embodiment, rules compiler 235 may insert processing instructions 320 to represent any domain-specific rules 212 or requirements of domain-specific schema 226 that cannot be represented as part of the generic compound document schema utilized by CMS 130. When compound document 300 is assembled and presented to a user, embedded processing instructions 320 may be used to enforce these requirements as the user edits the content of a child document (or node) or changes which documents are linked to by compound document 300.

Figure 4:
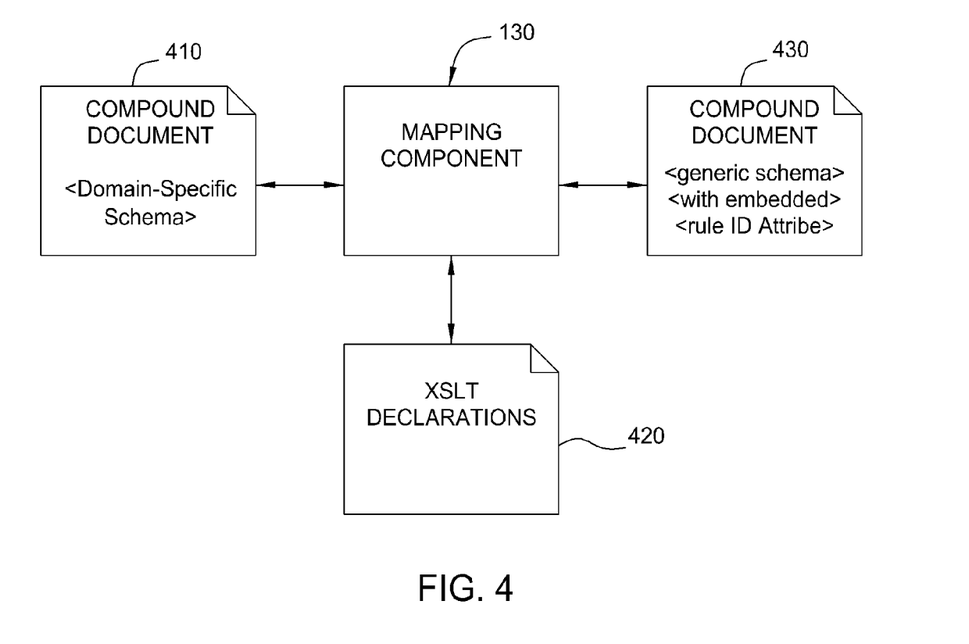
FIG. 4 further illustrates operations performed by a CMS mapping component to map a domain-specific compound document into a generic format utilized by the CMS, according to one embodiment of the invention.

FIG. 4 further illustrates the operations of mapping component 130 used by a content management system, according to one embodiment of the invention. Mapping component 130 may be configured to map a domain-specific compound document 410 into a generic compound document 430. As shown, mapping component 130 may use a set of XSLT declarations 420 to create generic compound document 430 from domain-specific compound document 410. As is known, XSLT is an XML-based language used for transforming a source XML document (i.e., domain-specific compound document 410) into a target document (i.e., generic compound document 430).

Figure 5:
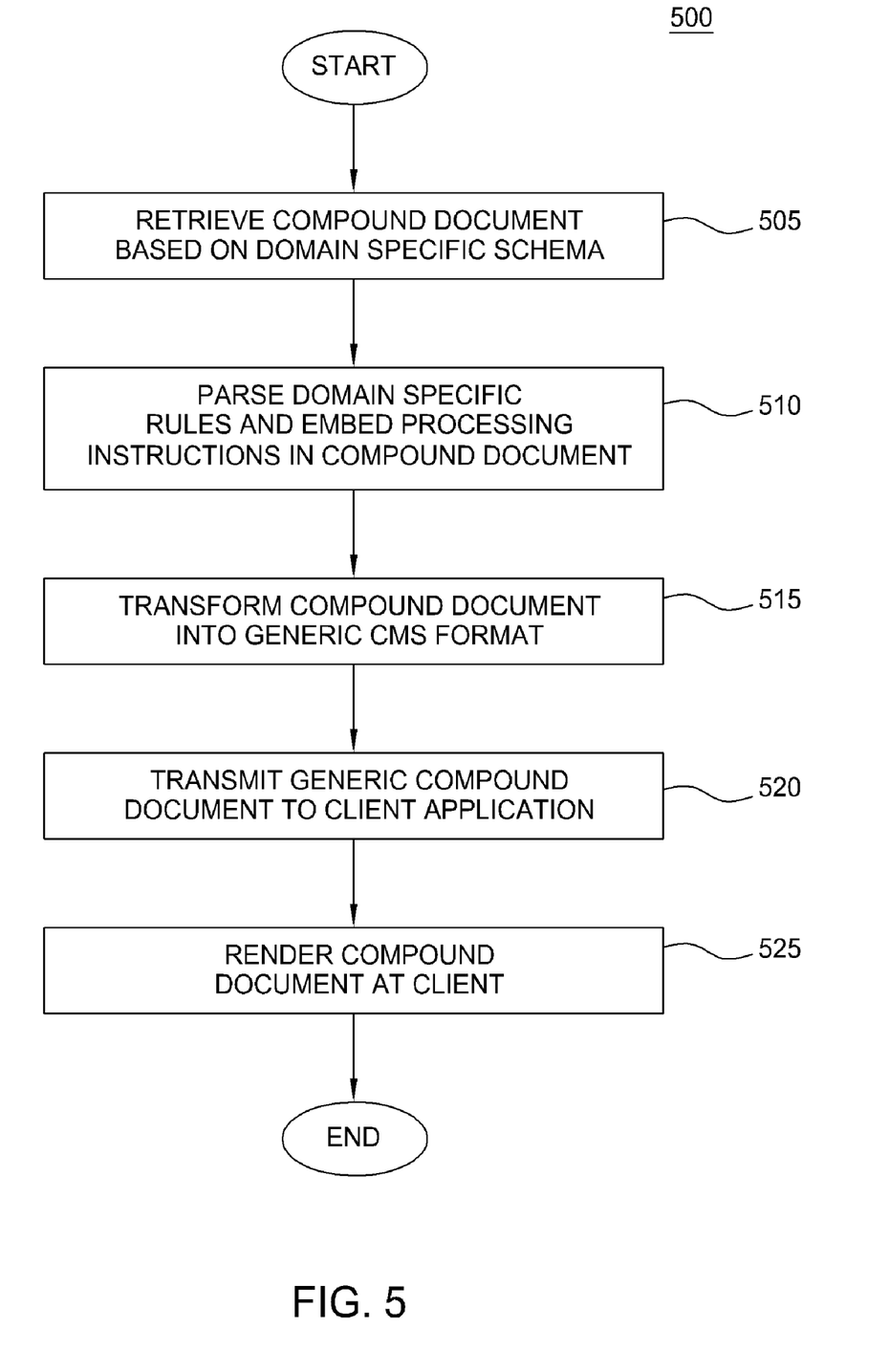
FIG. 5 illustrates a method for a content management system to process a domain-specific compound document, according to one embodiment of the invention.
Figure 6:
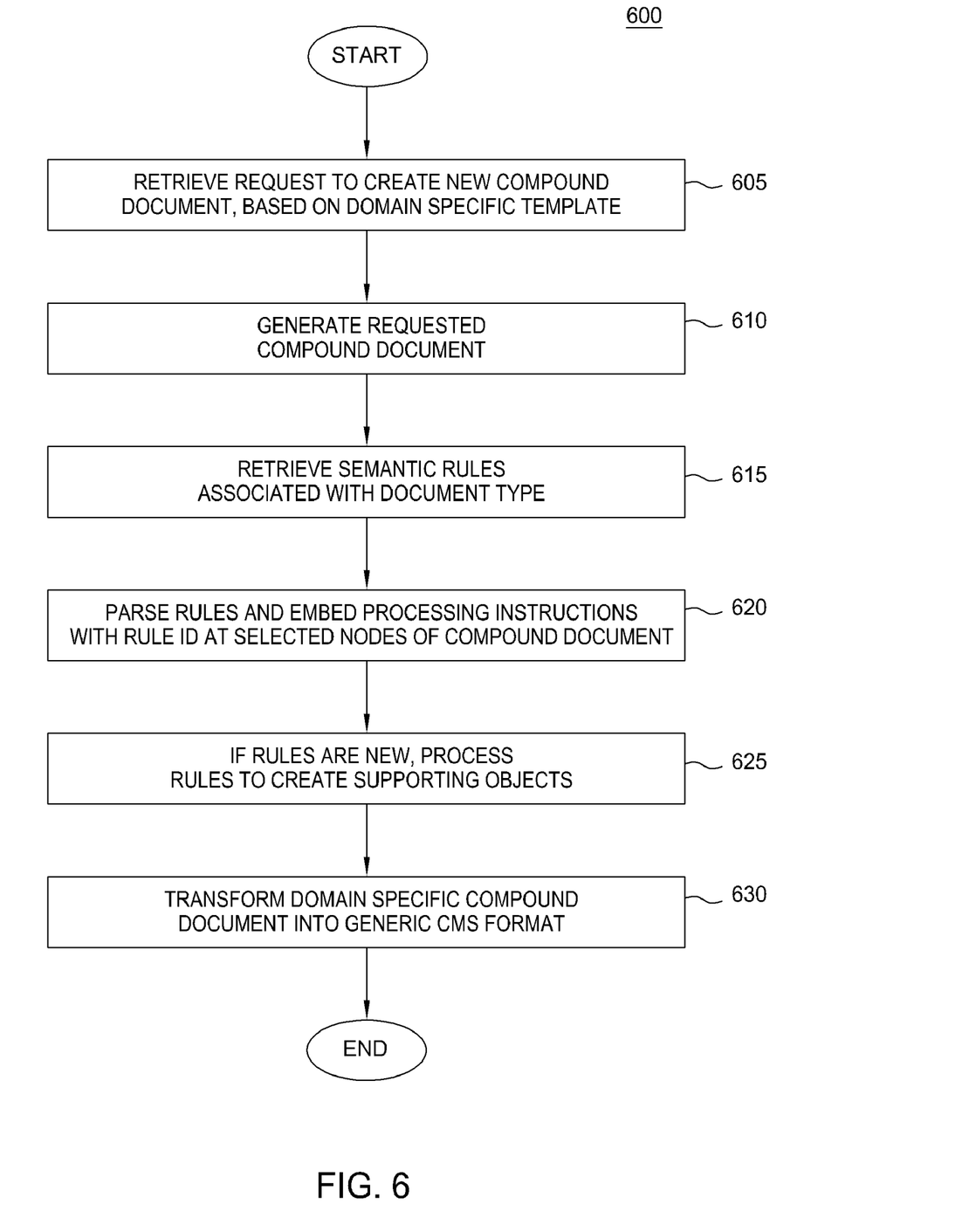
FIG. 6 illustrates a method for creating a new domain-specific compound document, according to one embodiment of the invention.
Figure 7:
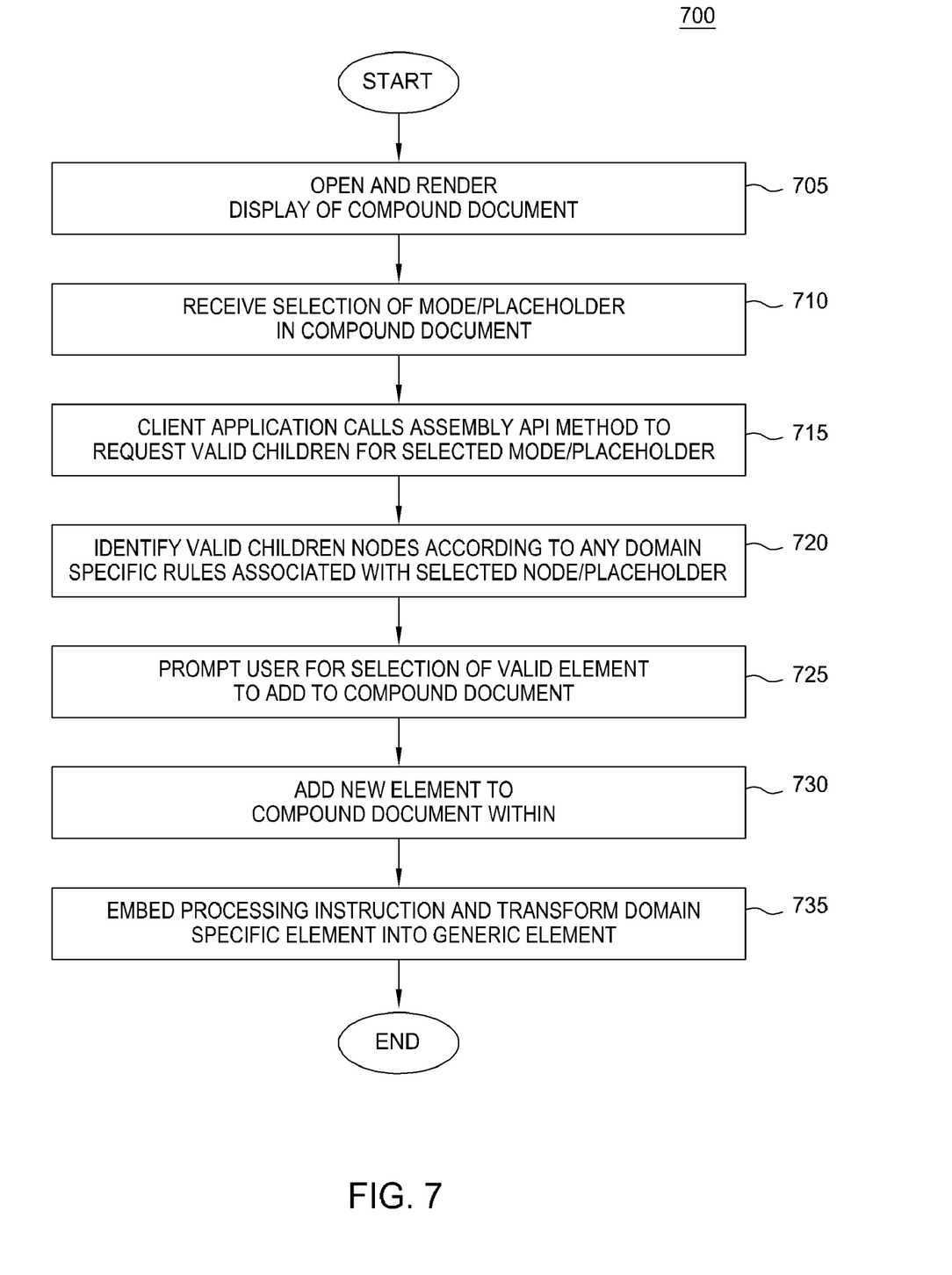
FIG. 7 illustrates a method for editing a domain-specific compound document, according to one embodiment of the invention.

FIGS. 5-7 illustrate exemplary methods for the software application framework described above to manage a compound document with domain-specific rules using the generic compound document schema of CMS 130. First, FIG. 5 illustrates a method 500 for a CMS 130 to map a domain-specific compound document into a generic compound document, according to one embodiment of the invention. As shown, method 500 begins at step 505 where CMS 130 retrieves a compound document configured according to a domain-specific schema. For example, CMS 130 may receive a request from a user interacting with client application 108 to assemble and present a compound document. In response, the CMS 130 may be configured to retrieve the requested compound document from data repository 140.

At step 510, rules compiler 235 may be configured to parse a domain-specific rules file 212 and embed processing instructions in the compound document to reflect any domain-specific rules in the generic compound document generated from the domain-specific one. As described above, domain-specific rules file 212 may be input to rules compiler 235 which in turn reads each rule, identifies the corresponding node(s) or element(s) within the domain-specific compound document to which the rule applies and inserts a processing instruction to indicate that a rule exists for such nodes or elements. Further, rules that apply to a particular domain-specific compound document type may be parsed into objects and stored in a table for use when a user accesses the generic compound document generated from the domain-specific one.

At step 515, the domain-specific compound document may be transformed into a format specified by the generic compound document schema used by CMS 130. For example, as shown in FIG. 4, mapping component 236 may use an XSLT transformation to transform the domain-specific compound document into the compound document format used by CMS 130 (e.g., compound document 300 illustrated in FIG. 3).

At step 520, the generic compound document may be transmitted to client application 108. At step 525, the generic compound document may be rendered and displayed to a user. Once rendered, the user may edit the structure, content, and position of child documents (or links to child documents) within the compound document. At the same time, the processing instructions embedded at step 510 may be used to enforce requirements of the domain-specific schema 226 or domain-specific rules 212.

FIG. 6 illustrates a method 600 for creating a new domain-specific compound document, according to one embodiment of the invention. Method 600 begins at step 605 where the CMS 130 receives a request to create a new compound document, based on a particular domain-specific template. In response, at step 610, the CMS may be configured to generate a new instance of a compound document, configured according to the domain-specific template specified at step 605. At step 615, the domain-specific rules file 212 associated with the domain-specific document type is retrieved from the configuration data 210. At step 615, rules compiler 235 may parse the rules and embed processing instructions in the appropriate nodes of the compound document. For example, the rules compiler may read each rule, determine the corresponding node within the domain-specific compound document to which the rule applies and insert the rule ID into that node to indicate that a rule exists for that node.

Additionally, at step 625, if any of the rules identified at step 620 are "new," i.e., rules that have not previously been processed by rules compiler 235, then when the rule is parsed, the CMS may create instances of condition objects to represent a rule using, e.g., an attribute name, an operator, and values to use for comparison when evaluating the rule, or as a plug-in object (e.g., a Java® object) which may be invoked to perform the logic associated with a given rule. Once created, the condition or plug-in objects may be stored in a table and referenced by a rule identifier.

At step 630, the domain-specific compound document generated at step 610 may be transformed into a format specified by the generic compound document schema used by CMS 130. For example, as shown in FIG. 4, mapping component 236 may use an XSLT transformation to transform the domain-specific compound document into the compound document format used by CMS 130 (e.g., compound document 300 illustrated in FIG. 3). After the transformation, the generic compound document includes attributes to identify which nodes or elements include rules. In one embodiment, compound document object 222 is also created in the data repository 140. For efficiency, the generic compound document 224 may be loaded into memory by the CMS 130 so that it can quickly return content to the CMS user interface 205 in response to user requests (e.g. when the user expands a node in the compound document and requests to see its children).

FIG. 7 illustrates a method 700 for editing a domain-specific compound document, according to one embodiment of the invention. For example, as described above, the CMS user interface 205 may include mechanisms for a user to add substantive elements to an existing placeholder in a compound document, may change which child documents (or links to child documents) are included within a compound document, or remove or rearrange existing elements or links present in a compound document. In one embodiment, although the compound document is assembled and presented to the user according to the generic compound document schema used by the CMS 130 (e.g., according to the method 500 of FIG. 5), the embedded processing instructions 320 may be used to enforce requirements of domain-specific schema 226 or domain-specific rules 233.

The method 700 begins at step 705 where CMS 130 receives a request to open a compound document. For example, the method 500 illustrated in FIG. 5 may be used to assemble the requested domain-specific compound document, transform the document into a generic form used by the CMS 130, and return the transformed compound document for presentation to the user.

Once presented, the user may perform editing operations provided by CMS 130 and CM user interface 205. For example, at step 710, the user may select to add a new child element to an existing placeholder in the compound document. In response, at step 715, the CMS user interface 220 may call assembly API 232 to request a set of valid children for the selected placeholder. If the selected placeholder or node has any embedded processing instructions, then the associated rule ID is provided to the assembly API 232. As described above, embedded processing instructions may be used to enforce requirements of domain-specific schema 226 or domain-specific rules 212.

At step 720, the assembly API 232 calls the rules engine 233 and passes the IDs of any rules associated with the placeholder or node to identify the valid children elements or nodes that may be included in the compound document, according to the domain-specific schema 226. For example, rules engine 233 may invoke an XML validator to identify the available children for the placeholder according to the domain-specific schema 226. In addition, if a domain-specific rule 212 exists for the node, then the rules engine may also determine which available children may be included in the compound document, according to domain-specific rules. Once identified, the rules engine 233 may be configured to return the list of child elements to the assembly API.

At step 725, the CMS user interface 205 may prompt the user with the list of child elements that are available to include to the compound document. At step 730, the user may select one of the child elements to add to the compound document, and the CMS user interface 205 may call the assembly API 232 to update the compound document with the newly added element. At step 735, rules compiler 235 may parse the rules and identify whether any domain-specific rules apply to the newly added element. If so, processing instructions may be embedded with in the compound document to reflect any domain-specific rules 212 applicable to the newly added element.

In addition to selecting elements to add to a compound document from a list of elements identified by the CMS 130, the CMS user interface may allow users to add elements, child documents (or links to child documents) to a compound document using a drag-and-drop mechanism. For example, the user may drag and drop an icon representing a document into the compound document tree provided by generic compound document 300. In response, the assembly API may perform a rules validation operation for the document dragged into compound document. In one embodiment, the assembly API 232 may invoke the rules engine 233, passing to it the compound document ID and the list of applicable rules for the target node or location which the document is dragged, a reference to the document being added to the compound document. If the rules for the target node are met, then the user is able to drop the document into the compound document. Otherwise, the operation may be prohibited.

Advantageously, by storing domain-specific rules as processing instructions the CMS may be configured to process the domain-specific compound document according to domain-specific schema and rules (e.g., an XML schema and DTD), while at the same time maintaining the compound document in a generic form accessible by multiple client applications.

In addition, any domain-specific requirements, (e.g., XML or DTD schema requirements) or any domain-specific requirements (e.g., semantic rules) may be embedded within the compound document as a set of processing instructions. The processing instructions store the requirements of the domain-specific rules and schema that cannot be represented as part of the generic compound document schema utilized by CMS. Thus, embodiments of the invention may allow users to create compound documents according to a domain-specific schema (e.g., the eCTD specification), but still provide the flexibility of managing the compound document using the generic schema provided by the CMS application.

While the foregoing is directed to embodiments of the present invention, other and further embodiments of the invention may be devised without departing from the basic scope thereof, and the scope thereof is determined by the claims that follow.

What is claimed is:

1. A computer implemented method of managing a compound document having one or more child documents in a content management system (CMS) executed by a processor, comprising:
   retrieving a domain-specific compound document configured according to a domain-specific schema;
   embedding a processing instruction in a node of the domain-specific compound document to reflect a rule associated with the node, wherein the rule specifies a semantic requirement required for a domain associated with the domain-specific compound document;
   transforming the domain-specific compound document into a generic compound document conforming to a generic compound document schema utilized by the CMS and a plurality of user applications;
   receiving, from a user interacting with the transformed, compound document using one of the plurality of user applications, a request to modify the node of the compound document;
   retrieving the processing instruction embedded in the node;
   enforcing the semantic requirement in the processing instruction by evaluating whether the requested modification conforms to the rule; and
   in response to determining the requested modification conforms to the rule, performing the requested modification.

2. The method of claim 1, wherein the domain-specific schema is composed using the XML markup language.

3. The method of claim 2, wherein transforming the domain-specific compound document into a generic compound document comprises applying an XSLT transform to the domain-specific compound document.

4. The method of claim 3, wherein the processing instruction embedded into the node of the domain-specific compound document is ignored by the XSLT transform.

5. The method of claim 1, wherein the generic compound document schema organizes the generic compound document as a hierarchical collection of nodes, where the schema specifies one or more nodes and position of the nodes in the generic compound document.

6. A computer-readable storage medium storing a program, which, when executed by a processor performs an operation for managing a compound document having one or more child documents in a content management system (CMS), the operation, comprising:
   retrieving a domain-specific compound document configured according to a domain-specific schema;
   embedding a processing instruction in a node of the domain-specific compound document to reflect a rule associated with the node, wherein the rule specifies a semantic requirement required for a domain associated with the domain-specific compound document;
   transforming the domain-specific compound document into a generic compound document conforming to a generic compound document schema utilized by the CMS and a plurality of user applications;
   receiving, from a user interacting with the transformed, compound document using one of the plurality of user applications, a request to modify the node of the compound document;
   retrieving the processing instruction embedded in the node;
   enforcing the semantic requirement in the processing instruction by evaluating whether the requested modification conforms to the rule; and
   in response to determining the requested modification conforms to the rule, performing the requested modification.

7. The computer-readable storage medium of claim 6, wherein the domain-specific schema is composed using the XML markup language.

8. The computer-readable storage medium of claim 7, wherein transforming the domain-specific compound document into a generic compound document comprises applying an XSLT transform to the domain-specific compound document.

9. The computer-readable storage medium of claim 8, wherein the processing instruction embedded into the node of the domain-specific compound document is ignored by the XSLT transform.

10. The computer-readable storage medium of claim 6, wherein the generic compound document schema organizes the generic compound document as a hierarchical collection of nodes, where the schema specifies one or more nodes and position of the nodes in the generic compound document.

11. A system, comprising:
    a processor; and
    a memory storing a program, which, when executed by a processor performs an operation for managing a compound document having one or more child documents in a content management system (CMS), the operation, comprising:
       retrieving a domain-specific compound document configured according to a domain-specific schema,
       embedding a processing instruction in a node of the domain-specific compound document to reflect a rule associated with the node, wherein the rule specifies a semantic requirement required for a domain associated with the domain-specific compound document,
       transforming the domain-specific compound document into a generic compound document conforming to a generic compound document schema utilized by the CMS and a plurality of user applications,
       receiving, from a user interacting with the transformed, compound document using one of the plurality of user applications, a request to modify the node of the compound document,
       retrieving the processing instruction embedded in the node,
       enforcing the semantic requirement in the processing instruction by evaluating whether the requested modification conforms to the rule, and
       in response to determining the requested modification conforms to the rule, performing the requested modification.

12. The system of claim 11, wherein the domain-specific schema is composed using the XML markup language.

13. The system of claim 12, wherein transforming the domain-specific compound document into a generic compound document comprises applying an XSLT transform to the domain-specific compound document.

14. The system of claim 13, wherein the processing instruction embedded into the node of the domain-specific compound document is ignored by the XSLT transform.

15. The system of claim 11, wherein the generic compound document schema organizes the generic compound document as a hierarchical collection of nodes, where the schema specifies one or more nodes and position of the nodes in the generic compound document.

* * * * *